(No Model.)
T. WARWICK.
WHEEL RIM AND TIRE.
No. 362,472. Patented May 3, 1887.
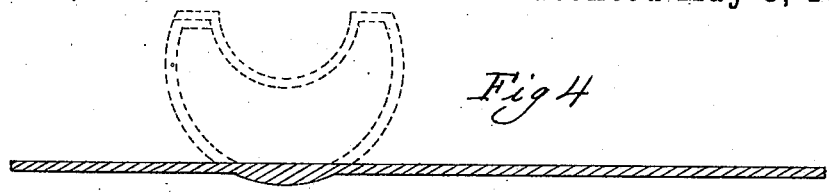
Fig 4
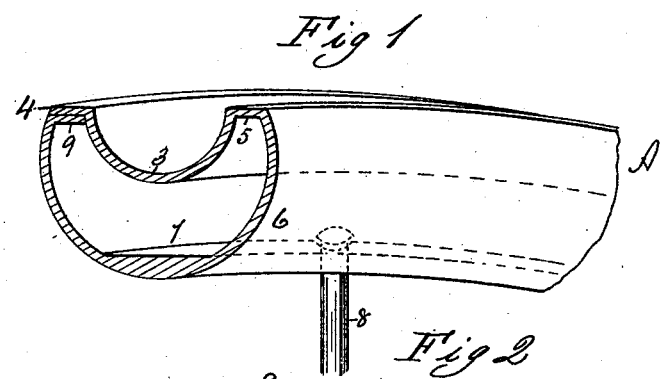
Fig 1
Fig 2
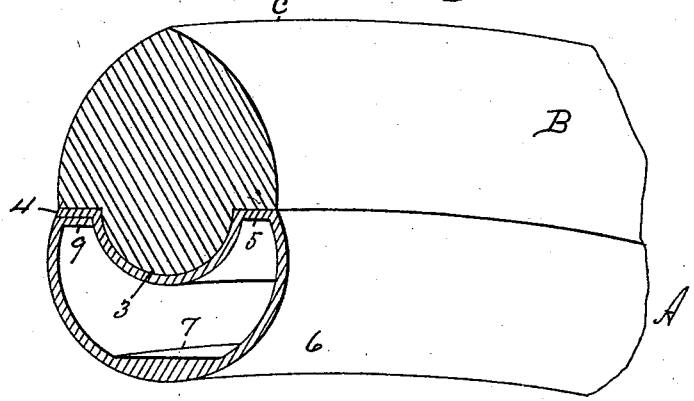
Fig 3
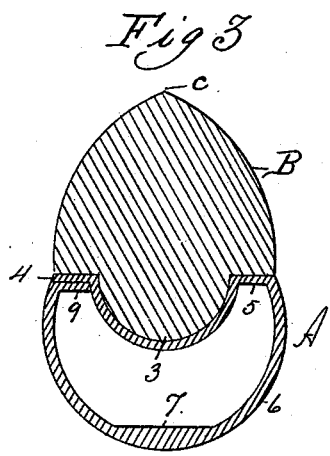
Witnesses
Wm H Chapin
G. M. Chamberlain.
Inventor
Thomas Warwick
By Chapin & Co
Attys.

UNITED STATES PATENT OFFICE.

THOMAS WARWICK, OF ASTON, NEAR BIRMINGHAM, COUNTY OF WARWICK, ENGLAND, ASSIGNOR TO GEORGE T. WARWICK, OF SPRINGFIELD, MASS.

WHEEL-RIM AND TIRE.

SPECIFICATION forming part of Letters Patent No. 362,472, dated May 3, 1887.

Application filed November 6, 1886. Serial No. 218,134. (No model.)

*To all whom it may concern:*

Be it known that I, THOMAS WARWICK, a citizen of England, residing at Aston, near Birmingham, in the county of Warwick, England, have invented new and useful Improvements in Wheel-Rims and Tires Therefor, of which the following is a specification.

This invention relates to improvements in wheel-rims and tires therefor, and pertains to wheels for bicycles and similar vehicles; and the invention consists in the peculiar construction of the rim and of the tire, as hereinafter fully described, and set forth in the claims.

In the drawings forming part of this specification, Figure 1 is a perspective view of a portion of a wheel-rim constructed according to my invention. Fig. 2 is a similar view of a portion of said rim and the tire therefor. Fig. 3 is a transverse section of the rim and tire. Fig. 4 is a transverse section of the metal plate from which the rim is formed.

In the drawings, 3 4 5 indicate the different surface parts of the periphery of the rim A of the wheel—viz., 3, a groove located about centrally between the sides of the rim, semicircular in cross-section, and 4 and 5 flat borders, one each side of said groove, extending between the sides of the latter and the outer sides of the rim A. The under side, 6, of the said rim is convex and substantially half-round in cross-section, or slightly in excess of that form, as shown in the drawings. The said under side of the rim is made, preferably, with its side opposite its periphery longitudinally thickened at 7, to provide for more firmly securing the ends of the spokes 8 thereto; but with the part 6 made of a certain thickness of metal, the extra thickness at 7 may be dispensed with. The under side of the said rim has formed on one edge thereof, an in-turned lip, 9, on which the said flat border part 4 of the periphery lies, and said border part and lip are united by brazing or other similar means, thereby forming what is commonly termed "a lap-joint."

The wheel-rim is rolled or drawn into a tube of the form shown, by any well-known suitable means, from a metal bar or plate having the form in cross-section shown in Fig. 4 when the under side of the rim is to be longitudinally thickened, as aforesaid; but when not so thickened, the plate is of uniform thickness. After the rim-tube is formed, as aforesaid, it is bent to a circle, and its ends are united by brazing.

The above-described rim is adapted to be used with any rubber or elastic tire, such as is in common use on bicycle-wheels, when the inner side of said tire is made with a semicircular central rib, as shown, on the tire B, and with narrow flat borders, one on each side of said rib, said rib and borders being adapted to fit into and lie against the aforesaid groove 3 and flat borders 4 and 5 of the periphery of the hollow rim A.

In order to provide an improved elastic tire for the above-described class of wheel-rims, in respect to the tread of the tire, for the purpose of avoiding the inconvenient spread or broadening of the said tread under the pressure of the load, as is the case when the ordinary round tires are used, the below-described improved tire is provided. The said spreading of the face of a tire conduces to resistance against the free rotation of the wheel on which it is fixed, and hence the within-described improved tire is so formed that under the weight of the vehicle and its load the face of the tire at its broadest part is much narrower than that of the usual round-faced tire under the same conditions.

The inner side of the tire B which illustrates said improved construction, when used on the above-described hollow rim A, is provided with the aforesaid central rib and borders, whereby said inner side is made to conform to the shape of the periphery of the rim A; but when used on an ordinary rim having simply a grooved periphery, the said inner side of the tire B is correspondingly formed; but whatever may be the form of the tread of the tire the flat borders 4 and 5 of the rim A serve, essentially, to support the sides of the tire and prevent undue spread of said tread.

The above-referred-to improved tire consists in making the sides of so much of the tire as is outside of the rim A of the form in cross-section of the sides of a spherical triangle, the apex c of said sides consituting the tread of the tire. The above-described tire form, and consequently very narrow tread, provides a tire which has very little spread, comparatively, under a load, and in a great measure obviates the above-referred-to inconvenience appertaining to round or circular faced tires. Said tire B is secured to the rim A by cementing in the usual manner.

What I claim as my invention is—

1. A tubular wheel-rim provided with a grooved periphery, and a flat border on each side of said groove, and having its under side convex and substantially half-round in cross-section, substantially as set forth.

2. A tubular wheel-rim provided with a grooved periphery and a flat border on each side of said groove, and having its under side convex and substantially half-round in cross-section, and longitudinally thickened at the center, substantially as set forth.

3. An elastic tire for a wheel-rim, having its under side conforming to the shape of the periphery of said rim and the sides thereof beyond the latter having the form of those of a spherical triangle, substantially as set forth.

4. A hollow metal wheel-rim having a groove in its periphery and on each side of said groove a flat border, and a tubular part underlying said periphery, having thereon an inbent lip extending under one of said borders, substantially as set forth.

5. A tubular wheel-rim provided with a grooved periphery and a flat border on each side of said groove, and having its under side convex and substantially half-round in cross-section, in combination with a rubber tire having its inner side conforming to said periphery, substantially as set forth.

THOMAS WARWICK.

Witnesses:
ROBERT HARMON,
EDWIN HOLLIS.